United States Patent [19]

Kumar

[11] Patent Number: 4,754,494
[45] Date of Patent: Jun. 28, 1988

[54] BERYLLIUM BASED, WEAR-RESISTANT MATERIAL FOR BEARINGS AND THE LIKE

[75] Inventor: Kaplesh Kumar, Wellesley, Mass.

[73] Assignee: The Charles Stark Draper Laboratory, Inc., Cambridge, Mass.

[21] Appl. No.: 756,751

[22] Filed: Jul. 18, 1985

[51] Int. Cl.$^4$ ............................................. F16C 32/06
[52] U.S. Cl. .................................. 384/112; 384/297; 384/907.1; 384/913
[58] Field of Search ............ 384/112, 297, 912, 907.1, 384/912, 913; 308/DIG. 8, DIG. 9; 277/DIG. 6, 96.2

[56] References Cited

U.S. PATENT DOCUMENTS

| | | |
|---|---|---|
| 3,155,439 | 11/1964 | Guzewicz . |
| 3,212,834 | 10/1965 | Mayer . |
| 3,384,578 | 5/1968 | Stuber ................................. 252/12 |
| 3,535,007 | 10/1970 | Klingler . |
| 3,721,307 | 3/1973 | Mayo .................................. 384/94 |
| 3,795,493 | 3/1974 | Mertl ................................. 29/182.5 |
| 3,850,820 | 11/1974 | Korshak ............................... 252/12 |
| 3,925,116 | 12/1975 | Engel .................................. 148/143 |
| 3,960,605 | 6/1976 | Beck ................................... 148/1.5 |
| 3,993,018 | 11/1976 | Kranik ................................ 118/52 |
| 4,017,951 | 4/1977 | Aromando ................... 29/149.5 PM |
| 4,097,759 | 6/1978 | Furbee ................................ 313/60 |
| 4,097,760 | 6/1978 | Cinelli ......................... 308/DIG. 9 |
| 4,125,637 | 11/1978 | Tanner ................................ 427/198 |
| 4,140,592 | 2/1979 | Orlando ........................... 204/56 R |
| 4,169,637 | 10/1979 | Voitas . |
| 4,189,194 | 2/1980 | Davies . |
| 4,216,270 | 8/1980 | Lawless ............................... 428/567 |
| 4,229,232 | 10/1980 | Kirkpatrick .......................... 148/1.5 |
| 4,243,728 | 1/1981 | Sato .................................... 428/570 |
| 4,306,907 | 12/1981 | Ahn ..................................... 75/150 |
| 4,308,321 | 12/1981 | Hodes .................................. 428/612 |
| 4,394,275 | 7/1983 | Bickle ................................. 252/12 |
| 4,435,839 | 3/1984 | Gu ....................................... 384/103 |
| 4,438,004 | 3/1984 | Myers .................................. 252/12 |
| 4,522,453 | 6/1985 | Lammer et al. ............. 308/DIG. 8 |

OTHER PUBLICATIONS

"Wear Behav. of Flat & Grad. Prof. B-Implanted Be," K. Kumar et al., Mat. Res. Soc. Symp. Proc., vol. 27 (1984).

Matls. Res. Adv. Inert. Instr., Task 2: Gas Bear'g. Matl. Dev. by Surface Mod. of Be, Tech. Rpt. No. 1, 30 Sep. '77–30 Jun. '78, R–1199, J. R. Palmieri.

Matls. Res. Adv. Inert. Instr., Task 2: Gas Bear'g. Matl. Dev., Dec. '82, Tech. Rpt. No. 5, 1 Oct. '81–30 Sep. '82, CSDL-R-1647, D. Das et al.

Primary Examiner—Lenard A. Footland
Attorney, Agent, or Firm—Weingarten, Schurgin, Gagnebin & Hayes

[57] ABSTRACT

A gas bearing and bearing surfaces capable of operating in an unlubricated configuration and providing reliable wear-resistant, start/stop cycling. The bearing typically comprises opposed surfaces of the same or different materials. A first surface is typically formed by ion implantation of boron into a beryllium metal bearing structure. The boron is typically implanted at a predetermined depth into the beryllium surface to provide a substantially pure beryllium surface. The second surface is typically PYROCERAM, a ceramic metal composite, such as a titanium diboride beryllium structure or a surface having titanium diboride and beryllium applied to a beryllium metal bearing structure by hot isostatic pressing facing. The second surface is adapted to run against the first, or against itself in the ceramic or ceramic surface case. The bearing configuration is capable of running reliably and with acceptably low wear through many start/stop cycles without the application of any lubricant. The titanium diboride, beryllium composite applied to a beryllium substrate finds further application such as in wear or impact-resistant surfaces.

11 Claims, 1 Drawing Sheet

4,754,494

BERYLLIUM BASED, WEAR-RESISTANT MATERIAL FOR BEARINGS AND THE LIKE

FIELD AND BACKGROUND OF THE INVENTION

The present invention relates to the formation of facing bearing surfaces for use in a gas bearing configuration, typically for gyroscope applications, and to the formation of resistant beryllium surfaces.

Gas bearings for use in gyroscopes are known in which beryllium, with or without additives, implantations, or surface treatment forms a bearing surface. In normal gas bearing operation with the bearing surfaces typically rotating against each other, the bearing surfaces are effectively separated by a hydrodynamic gas film and do not make contact. In such case there is no frictional wear of any appreciable magnitude between the surfaces. However, such bearings must cycle through start/stop sequences during which the bearing surfaces do contact each other during slow speed rotation prior to liftoff when the rotating elements supported by the bearing are accelerating or during touchdown when the rotating elements supported by the bearing are decelerating. During these moments of bearing contact, substantial bearing wear must be avoided.

In the prior art it has been a practice to lubricate the bearing surfaces with a precisely-defined amount of liquid lubricant in order to minimize the wear of the bearing surfaces during the start/stop cycles when they are in physical contact with each other. The amount of lubricant applied is a critical factor, and any error in the amount of lubricant can result in a seizure of the bearing, requiring the gyroscopic instrument undergo costly repair.

SUMMARY OF THE INVENTION

In accordance with the teaching of the present invention, a set of mating, similar or dissimilar bearing surfaces is provided for a gas bearing configuration and permits the bearing surfaces to be run through numerous start/stop cycles without lubrication, experiencing acceptably low material wear for use in such critical applications as gyroscopic instrument bearings. A bearing surface according to the invention finds applications in areas requiring a resistant surface.

In accordance with the specific teaching of the present invention, a first bearing surface, typically lining the journal and thrust bearing plates of a spool bearing, is formed by boron-ion implantation of a beryllium metal bearing structure. The boron implantation is typically produced in a atom concentration of 10–60 percent and exists at a depth within the beryllium material, forming a thin surface, typically only 500 Angstroms in depth, of substantially pure beryllium.

A second bearing surface is formed typically of PYROCERAM, a ceramic beryllium composite or by ceramic beryllium layers on a beryllium structure. Pyroceram is a glass ceramic, including magnesium, alumina, silica and some titanium oxide. Preferably, the second bearing surface is formed by a titanium diboride and beryllium mixture applied as a surface to a berryllium metal structural material by hot isostatic pressing.

It is found that this combination of materials can be utilized without lubrication, thereby avoiding the complexity of precise lubrication and tendency to failure. The ceramic and beryllium surfaced beryllium composite is also of value in applications requiring a surface on beryllium resistant, for example, to such forces as wear and impact.

The first and second surfaces may each run against the other or against itself in the ceramic or ion implanted case.

BRIEF DESCRIPTION OF THE DRAWING

These and other features of the present invention are more fully illustrated below in the solely exemplary detailed description and accompanying drawing of which.

DETAILED DESCRIPTION

The present invention contemplates two bearing surfaces which are adapted to mate to the other or itself in a gas bearing configuration that permits the bearings to operate in highly sensitive bearing applications, such as gyroscope instrumentation and without lubrication between the surfaces. One bearing surface find application in uses needing a resistant surface on beryllium or other metals.

Figure 1:
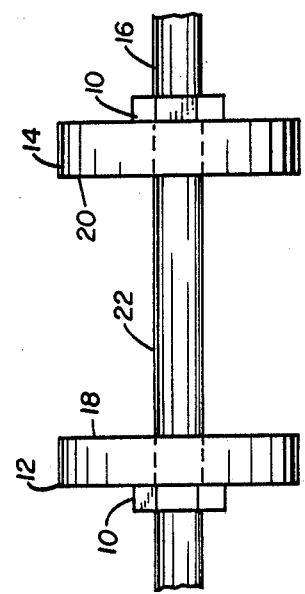
FIG. 1 is a diagrammatic view of a first bearing surface in accordance with the teaching of the present invention in the form of a spool bearing.

By reference to FIG. 1, there is illustrated a spool bearing having end plates 12 and 14 secured by nuts 10 to provide thrust bearing support along a central axial spindle 16. The spindle 16 provides a journal bearing function. The thrust plates 12 and 14 have bearing surfaces 18 and 20, respectively, while the central spindle 16 has a journal bearing surface 22.

Figure 3:
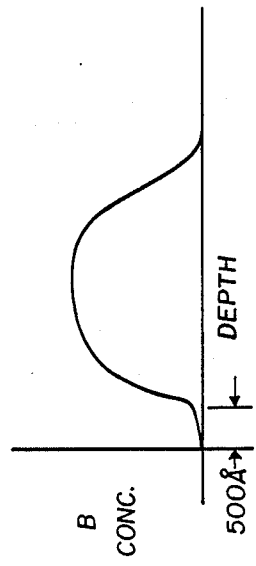
FIG. 3 is a concentration diagram illustrating the concentration profile of the ion additive to the bearing surface of FIG. 1.

The thrust plates 12 and 14 and the journal spindle 16 are formed of beryllium metal in the preferred embodiment to provide the structural bearing support. Beryllium is particularly useful in this application because of its low density and its strength, hardness and thermal conductivity. The bearing surfaces 18, 20 and 22 are formed by the implantation of boron ions into the beryllium structure. The ion implantation is achieved using conventional ion implantation techniques to provide a concentration profile, typically illustrated in FIG. 3. As shown there, the concentration of boron will be very low at the surface and to a slight depth of typically 500 Angstroms, yielding a surface of substantially pure beryllium. Below the immediate surface, the concentration of boron increases to and stabilizes at a level in the range of 10–60 atom percent boron, and then falls off to substantially zero.

Figure 2:
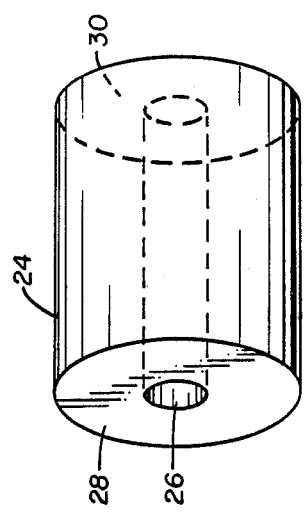
FIG. 2 is a diagrammatic view of a second bearing surface and rotating element adapted to mate in gas bearing configuration to the bearing of FIG. 1.

The surfaces 18, 20 and 22 are additionally configured with grooves, or other structures typical for gas bearing applications, which cause a pressurization of environmental gas between the surfaces 18, 20 and 22 and the opposing bearing surfaces described with respect to FIG. 2 when a sufficient relative speed between the two bearing surfaces is experienced. This hydrodynamic floating effect produces a substantially friction-free bearing at speed and minimizes or eliminates any and all frictional wear between the bearing surfaces. The configuration and construction of such air bearing grooves are known in the art and will not be further described in the present application.

With respect to FIG. 2, there is illustrated a cylindrical rotor element 24 having a central axial channel 26 and end surfaces 28 and 30. The cylinder 24 is typically a part of a rotor of a gas bearing gyroscope and, utilizing excitation coils and supplies, not shown, is capable of being rotated about the spindle 16 when mounted between the thrust plates 12 and 14 of the spool bearing of FIG. 1.

The bearing surface for the rotor 24 of FIG. 2 can be the same as the surface 18, 20 and 22. Preferably, however, these bearing surfaces are produced by fabricating the rotor 24 of PYROCERAM (a Corning trademark for a glass ceramic including magnesium, alumina, silica and some titanium oxide.), or of beryllium and titanium diboride composite.

Alternatively, a bearing surface is applied to a beryllium rotor 24, along the inside surface of the channel 26 and to the end surfaces 28 and 30, by hot isostatic pressing of a powdered ceramic and beryllium mixture. In a preferred embodiment, titanium diboride and beryllium powders are applied to the surfaces of channel 26 and surfaces 28 and 30 in a canister and, using hot isostatic pressing techniques, form a dispersion of titanium diboride within the beryllium material of the rotor 24.

In the preparation of the surface layer of titanium diboride dispersion in the beryllium bearing structure, a steel mandrel is placed through the aperture of channel 26 and the titanium diboride and beryllium powders filled and tamped around it. Titanium diboride and beryllium powders are also applied to the surfaces 28 and 30 and a hot isostatic canister placed to compress, under pressure, the powders onto the surfaces 28, 30 and the inside of the channel 26. After the hot isostatic process is completed, the steel mandrel will typically be machined out of the channel 26, leaving the titanium diboride dispersion in the beryllium structural material in the surface of the channel 26.

The composite structure of a beryllium and titanium diboride surfaced beryllium structure is useful also where a beryllium structure requires a resistant surface. The same advantage can be applied with other metal-ceramic combinations.

In a preferred process for the fabrication of rotor 24 as a solid beryllium and titanium diboride structure, $-325$ mesh beryllium powders, along with powders of titanium diboride, are blended to yield a 35–55 percent volume of the ceramic powder. The blended powders are then placed inside rubber boots and cold isostatically pressed at a pressure of approximately 60 kpsi. The resulting green compact is encapsulated, under vacuum, in low carbon steel container and hot isostatically pressed for two hours at a temperature of 975° C. and an inert gas pressure of 15 kpsi in a high temperature autoclave.

Ceramics other than titanium diboride, for example, titanium carbide (Ti C), may be utilized as well.

The bearing structure of boron implanted beryllium or beryllium with a titanium diboride dispersion can function as unlubricated bearing surfaces against a solid ceramic material.

The above description of a preparation of bearing or resistant surfaces of similar or dissimilar surface types permits the application of high performance gas bearings without any bearing lubrication and yet the capability of producing repeated start-to-stop cycles without unacceptable surface wear conditions.

Accordingly, the invention is to be construed and limited only in accordance with the following claims:

What is claimed is:

1. An unlubricated gas bearing structure comprising:
   first and second bearing elements, said bearing elements respectively having first and second surfaces adapted to be operated in facing relationship in a gas bearing configuration;
   at least one of said first and second surfaces being grooved to provide gas bearing hydrodynamic lift between said surfaces;
   at least said first surface comprising boron-implanted beryllium;
   said second surface having a second material thereon;
   neither surface having auxiliary lubrication thereon; and
   said second material including PYROCERAM.

2. The bearing of claim 1 wherein said first surface is formed on a spool bearing having journal and thrust plate surfaces forming said first surface; and
   said second surface is an interior channel through a cylinder and opposing end surfaces of cylinder adapted to face the spool bearing of said first surface.

3. The bearing of claim 1 wherein said first surface is substantially pure beryllium at the surface with a boron ion implantation in a depth range below the surface thereof.

4. The bearing of claim 3 wherein the depth of said substantially pure beryllium is approximately 500 Angstroms.

5. The bearing of claim 1 wherein the concentration of boron ions in the boron-implanted beryllium is in the range of 10–60 atom percent boron.

6. An unlubricated gas bearing structure comprising:
   first and second bearing elements, said bearing elements respectively having first and second surfaces adapted to be operated in facing relationship in a gas bearing configuration;
   at least one of said first and second surfaces being grooved to provide gas bearing hydrodynamic lift between said surfaces;
   at least said first surface comprising boron-implanted beryllium;
   said second surface having a second material thereon;
   neither surface having auxiliary lubrication thereon; and
   said second material second surface including a beryllium metal matrix having a ceramic dispersion therein.

7. The bearing of claim 6 wherein said beryllium-ceramic dispersions include titanium diboride (Ti $B_2$) or titanium carbide (Ti C) as the ceramic.

8. The bearing of claim 6 wherein said first surface is substantially pure beryllium at the surface with a boron ion implantation in a depth range below the surface thereof.

9. The bearing of claim 8 wherein the depth of said substantially pure beryllium is approximately 500 Angstroms.

10. The bearing of claim 6 wherein the concentration of boron ions in the boron implemented beryllium is in the range of 10–60 atom percent boron.

11. The bearing of claim 6 wherein said first surface is formed on a spool bearing having journal and thrust plate surfaces forming said first surface; and said second surface is an interior channel through a cylinder and opposing end surfaces of said cylinder adapted to face the spool bearing of said first surface.

* * * * *